Figure 1:
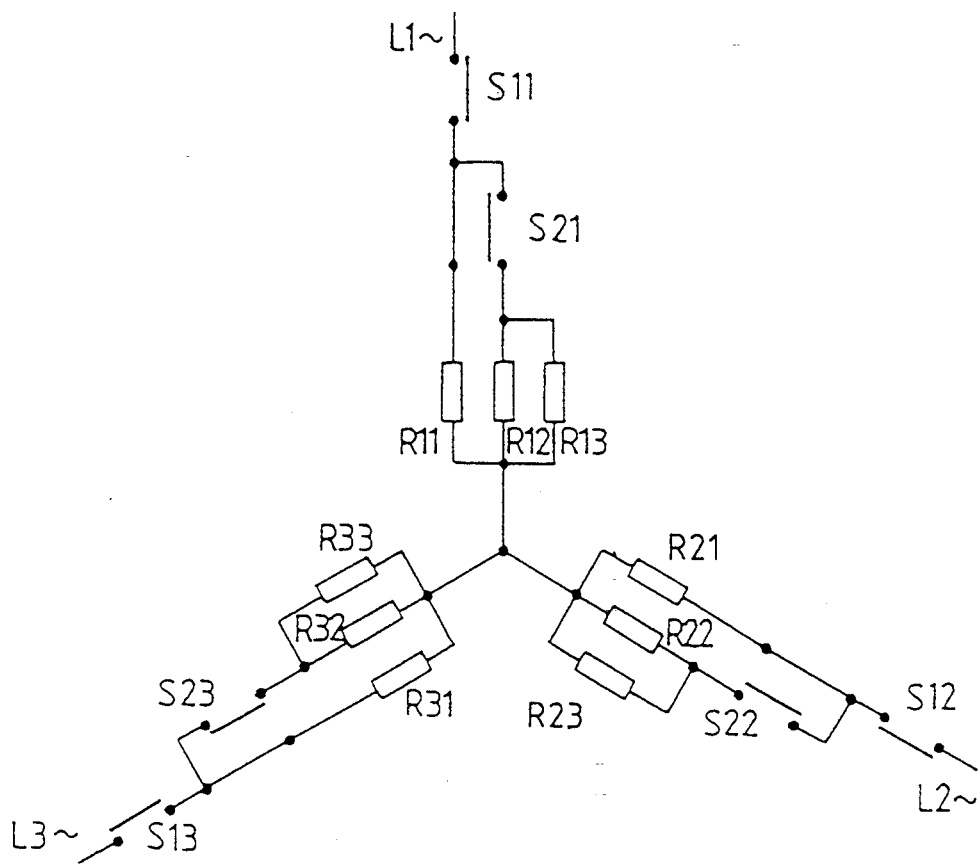

United States Patent [19]

Uuskoski

[11] Patent Number: 5,451,854
[45] Date of Patent: Sep. 19, 1995

[54] PROCEDURE FOR REDUCING THE STARTING CURRENT OF A SQUIRREL-CAGE MOTOR, AND A SQUIRREL-CAGE MOTOR UNIT DESIGNED FOR IMPLEMENTING THE PROCEDURE

[75] Inventor: Klaus Uuskoski, Hyvinkaa, Finland

[73] Assignee: Kone Elevator GmbH, Baar, Switzerland

[21] Appl. No.: 352,294

[22] Filed: Dec. 8, 1994

Related U.S. Application Data

[63] Continuation of Ser. No. 836,134, Feb. 14, 1992.

[30] Foreign Application Priority Data

Feb. 18, 1991 [FI] Finland .................. FI901769

[51] Int. Cl.[6] .................................. H02K 17/12
[52] U.S. Cl. .................. 318/778; 318/786; 310/198
[58] Field of Search ............... 318/775, 777, 771, 778, 318/814, 816, 786, 713, 785, 784, 797, 700; 310/198

[56] References Cited

U.S. PATENT DOCUMENTS

| | | |
|---|---|---|
| 1,899,858 | 2/1933 | Early . |
| 1,899,859 | 2/1933 | Early . |
| 2,649,561 | 8/1953 | Hutchins . |
| 3,068,389 | 12/1962 | Cantonwine . |
| 3,237,072 | 2/1966 | Cantonwine . |
| 3,573,579 | 4/1971 | Lewus .................. 318/775 |
| 3,949,254 | 4/1976 | Woll et al. . |
| 4,004,203 | 1/1977 | Chalmers et al. .................. 318/713 |
| 4,296,344 | 10/1981 | Rabe .................. 318/777 |
| 4,417,192 | 11/1983 | Gosh . |
| 4,450,399 | 5/1984 | Tanaka .................. 318/814 |
| 4,477,767 | 10/1984 | Cotzas .................. 310/198 |
| 4,890,049 | 12/1989 | Avinger .................. 318/771 |

FOREIGN PATENT DOCUMENTS

| | | |
|---|---|---|
| 0205877 | 12/1986 | European Pat. Off. . |
| 2262431 | 9/1975 | France . |
| 280052 | 9/1913 | Germany . |
| 62-189952 | 8/1987 | Japan . |

Primary Examiner—William M. Shoop, Jr.
Assistant Examiner—John W. Cabeca
Attorney, Agent, or Firm—Kenyon & Kenyon

[57] ABSTRACT

A method for reducing the starting current of a squirrel-cage motor and a squirrel-cage motor unit designed for implementing the method for reducing the starting current. The squirrel-cage motor stator winding of each phase comprises at least two insulated conductor elements connected in parallel and placed in the same slots. The conductor elements are divided into at least two parallel branches. During starting one or more branches are disconnected from the supply voltage while one or more branches are connected to the supply voltage. With this arrangement, the stator resistance increases during starting, so that the starting current decreases accordingly.

7 Claims, 1 Drawing Sheet

PROCEDURE FOR REDUCING THE STARTING CURRENT OF A SQUIRREL-CAGE MOTOR, AND A SQUIRREL-CAGE MOTOR UNIT DESIGNED FOR IMPLEMENTING THE PROCEDURE

This application is a continuation of application Ser. No. 07/836,134, filed on Feb. 14, 1992.

FIELD OF THE INVENTION

The present invention relates to a method for reducing the starting current of a squirrel-cage motor and to a squirrel-cage motor unit designed for implementing this method.

BACKGROUND OF THE INVENTION

Generally, a squirrel-cage motor is started by closing the stator circuit power switch. However, because of the large-starting current surge, a squirrel-cage motor can not usually be started in this straightforward manner. The large current surge may produce such a large voltage swing that the operation of the electric equipment, connected to the same supply network (especially lamps), is disturbed. This is the main reason why there have been developed several techniques for starting a squirrel-cage motor, which are designed to reduce the starting current. Conventionally, the starting current is reduced e.g. by using star-delta starting or by connecting starting resistances between the stator and the supplying network.

However, star-delta starting cannot be used in all situations because there are relatively large transient changes in the current at the moment of switching from star to delta connection. Especially in weak networks, these current variations may cause disturbances in functioning of the electric equipment connected to the network, e.g. blinking of lamps, just as the above-described direct starting does. Again, the use of starting resistances requires the installation of extra resistors.

U.S. Pat. No. 4,417,192 (Ghosh) and EP 0205877 (Ghosh) present different winding systems for starting. These winding systems apply to motors having a given number of pole pairs and certain q-values (number of slots per pole and phase). Therefore, for example in the case of motors with single layer windings, it is impossible to use one winding coil per pole and phase with these systems.

SUMMARY OF THE INVENTION

The object of the present invention is to reduce the drawbacks referred to and to provide a method for reducing the starting current of a squirrel-cage motor and a squirrel-cage motor unit designed for implementing this method.

The solution offered by the present invention is easy to realize. This solution requires a minimal number of components, i.e. a switching contactor and a time relay.

With the starting procedure of the present invention, the torque characteristic contains only the same harmonic torques as for the normal connection, because all the slots are in use during the starting. The transient current changes occurring at the instant of switching from one connection mode to another are very small because the stator current need not be switched off at the instant of changeover. Thus the solution of the invention is particularly applicable in the case of weak networks and low-power starting, e.g. in hydraulic elevators used in accommodation units. For example in the case of low-power starting, the starting current is reduced by 50% and the transient current even more.

The invention is applicable to all types of windings regardless of the number of poles, the number of slots and the q-value.

Moreover, the required calculations for the motor of the invention may be performed by the same methods that are currently used for squirrel-cage motors. Furthermore, the present invention provides solutions for the adjustment of the starting torque of the motor.

BRIEF DESCRIPTION OF THE PREFERRED EMBODIMENT

Figure 2:
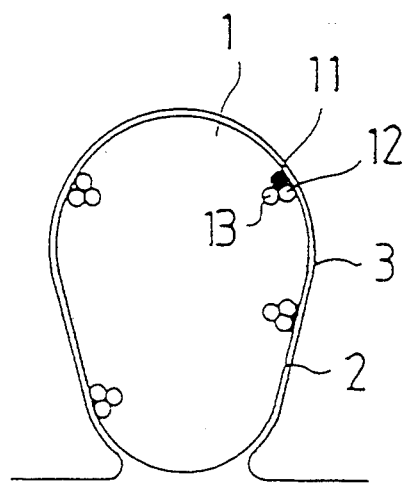

In the following, the invention will be described in detail by the aid of an example, referring to the drawings attached, wherein:

FIG. 1 illustrates the stator winding of the squirrel-cage motor of the invention; and FIG. 2 illustrates a slot of the squirrel-cage motor of the invention, and the conductors placed in the slot.

In the three-phase squirrel-cage motor of the present invention, the winding conductors of each phase, which form the winding coils in each phase, consist of conductor elements. These consist of insulated coil wire and are presented in FIG. 1 as resistances R11, R12, R13, R21, R22, R23, R31, R32 and R33. In each phase L1, L2 and L3 of the stator winding, the elements of the winding conductors are divided into two branches, each of which comprises one or more parallel conductor elements. Each branch is symmetrical with the corresponding branch of the other phases.

For starting, only branches R11, R21 and R31 of the conductor elements of a phase are connected to the supply voltage while the remaining branch pairs R12, R13; R22, R23; and R32, R33 are disconnected from the supply voltage, resulting in a reduced conductor cross-section and an increased stator resistance. Therefore, the short-circuit impedance of the motor increases and the starting current and starting torque decrease. In the embodiment illustrated in FIG. 1, there are three parallel conductor elements in each phase, and only one element is used during starting. By varying the resistance of the winding branches, e.g. the number of conductor elements of a branch, it is possible to vary the current and torque values as desired. The windings can be connected in star mode as shown in FIG. 1 or in delta mode. All parallel connections are also possible.

FIG. 2 shows the parallel conductor elements 11, 12 and 13 of the winding conductor 1 of phase L1. As above in FIG. 1, the conductor forms a winding coil and is placed in a slot 3 provided with insulation 2. Only one of these conductor elements, i.e. 11, shown in black colour, is used for starting. As shown in FIG. 2, the elements of the winding conductor are placed in the same slots in each phase and they are wound with the same fractional pitch.

At the beginning of the starting operation, the supply voltage of the motor is switched on by closing the contacts S11, S12 and S13 of the switching contactor connected to the terminals of the stator winding. After the motor has been started, the contacts S21, S22 and S23 of the change-over contactor connecting the second branch of conductor elements to the first branch are closed as well.

It is obvious to a person skilled in the art that different embodiments of the invention are not restricted to the examples described above, but that they may instead be varied within the scope of the following claims.

Instead of the divided winding conductor illustrated in FIG. 2, it is possible to use three separate conductor elements placed in the same slots. However, this leads to a reduced resistance to starting stress because the heat of the current carrying conductor element cannot be immediately transferred to the adjacent conductor element which carries no current during starting. This kind of heat transfer is possible in the case of FIG. 2, where the winding conductor consists of three parallel conductor elements.

I claim:

1. A three phase squirrel-cage motor unit powered by a supply voltage, said motor having a stator with a plurality of slots, said unit comprising:

a respective stator winding corresponding to each phase of said motor, each respective stator winding comprising at least two respective branches of insulated conductor elements defining a starting branch and at least one second branch, said at least two branches of insulated conductor elements being electrically connected in parallel and continuously arranged together in the slots of said stator, such that each conductor element of said starting branch is continuously disposed adjacent to, and in contact with, corresponding conductor elements of said at least one second branch;

starting means for electrically connecting said starting branch to a supply voltage while said at least one second branch remains disconnected from the supply voltage, so that the stator resistance increases during starting and the starting current decreases accordingly, and whereby heat generated in the conductor elements of said starting branch during starting is transferred to the conductor elements of said at least one second branch; and switching means for connecting said at least one second branch which was disconnected during starting, so that the squirrel-cage motor is allowed to function at working parameters.

2. A three phase squirrel-cage motor unit according to claim 1, wherein the branches of a phase are symmetrically divided with respect to the other phases.

3. A three phase squirrel-cage motor unit according to claim 1, wherein said switching means further comprises a time relay to timely reconnect said disconnected branch after the starting of the motor.

4. A three phase squirrel-cage motor unit according to claim 1, wherein each of said respective stator windings comprises a single winding conductor having a plurality of insulated conductor elements.

5. A three phase squirrel-cage motor unit according to claim 1, wherein each of said respective stator windings comprises separate conductor elements.

6. A method for reducing a starting current of a three-phase squirrel-cage motor powered from a supply voltage, said motor having a stator with a plurality of slots and a stator winding for each phase, comprising the steps of:

(a) dividing the stator winding into at least a starting branch and at least one second branch of insulated conductor elements;

(b) providing switching means for electrically connecting and disconnecting said branches together in parallel;

(c) disposing said stator winding in said slots such that each slot includes at least both branches and the conductor elements of said starting branch are disposed continuously adjacent to, and in contact with, corresponding conductor elements of said at least one second branch;

(d) actuating said switching means to disconnect said at least one second branch from said first starting branch and connecting said first starting branch to the supply voltage, for decreasing the starting current;

(e) starting the squirrel cage motor; and (f) actuating said switching means to reconnect said second branch in parallel with said first branch.

7. A method according to claim 6, further comprising adjusting the value of the current flowing in said parallel branches and the torque by varying the electrical resistance of said parallel branches.

* * * * *